(12) United States Patent
Behlow

(10) Patent No.: US 7,194,200 B1
(45) Date of Patent: Mar. 20, 2007

(54) CAMERA ATTACHMENT FOR COMPRESSING PLIANT OBJECTS DURING PHOTOGRAPHY THEREOF

(76) Inventor: Charles L. Behlow, 2907 Minot Ave., Cincinnati, OH (US) 45209

( * ) Notice: Subject to any disclaimer, the term of this patent is extended or adjusted under 35 U.S.C. 154(b) by 221 days.

(21) Appl. No.: 11/042,361

(22) Filed: Jan. 25, 2005

(51) Int. Cl.
*G03B 15/00* (2006.01)

(52) U.S. Cl. ............................. 396/5; 396/428; 396/544

(58) Field of Classification Search .................. 396/5, 396/419, 428, 544; 355/21, 75; 348/63, 348/375
See application file for complete search history.

(56) References Cited

U.S. PATENT DOCUMENTS

| | | | | |
|---|---|---|---|---|
| 1,837,704 | A | * | 12/1931 | Harrie ........................ 355/75 |
| 2,112,449 | A | * | 3/1938 | Proudfit ...................... 355/62 |
| 2,322,032 | A | | 6/1943 | Kunze |
| 2,404,556 | A | * | 7/1946 | Wirth ......................... 396/25 |
| 3,102,459 | A | | 9/1963 | Zimberoff |
| 3,330,193 | A | | 7/1967 | Kaess |
| 3,385,188 | A | | 5/1968 | Ellman |
| 3,451,321 | A | * | 6/1969 | Sullivan et al. ............... 355/21 |
| 3,453,943 | A | * | 7/1969 | Newcomb .................... 355/66 |
| 3,687,030 | A | | 8/1972 | Dine et al. |
| 4,115,813 | A | * | 9/1978 | Mikami ....................... 348/63 |
| 4,222,654 | A | * | 9/1980 | Bodenhamer ............... 396/428 |
| 4,616,912 | A | | 10/1986 | Johnsen |
| 4,755,838 | A | | 7/1988 | Lemmey |
| 5,294,948 | A | | 3/1994 | Merkt et al. |
| 5,416,544 | A | | 5/1995 | Stapleton |
| 5,633,674 | A | * | 5/1997 | Trulaske et al. .............. 348/63 |
| 5,708,902 | A | | 1/1998 | Navarro |
| 5,862,428 | A | | 1/1999 | An |
| 5,950,017 | A | | 9/1999 | Reff |
| 6,052,534 | A | | 4/2000 | Goto |

* cited by examiner

*Primary Examiner*—W. B. Perkey
(74) *Attorney, Agent, or Firm*—Bruce J. Bowman

(57) ABSTRACT

A camera attachment is configured, adapted and/or operative to compress a pliant object or subject for allowing photographing of the object therethrough by the camera to which the camera attachment is coupled. The camera attachment allows the user to apply a variable compressive force to an object to be photographed through application of a compressive force on the camera. The variable compressive force applied by the user on the camera is translated to a compression portion of the camera attachment and onto the object. The compression portion includes a compression plate that is composed of a material suitable for the functions and/or features described herein and particularly of a material having light characteristics that range from minimally opaque to entirely translucent for photographing the object it is compressing. Additionally, the overall length of the camera attachment is variable through adjustable length support structures such that the distance between the camera lens and the compression plate may be changed. The lens-to-compression plate distance is thus variable, ranging from a minimum lens-to-plate distance to a maximum lens-to-plate distance. These parameters are controlled by size of the camera attachment. The adjustable length support structures of the camera attachment are independently adjustable and independently releasably fixable in length. Also, one or more support structure may carry representations and/or markings for providing one or more of a scale, reading, position and/or camera parameter and/or setting.

15 Claims, 3 Drawing Sheets

CAMERA ATTACHMENT FOR COMPRESSING PLIANT OBJECTS DURING PHOTOGRAPHY THEREOF

BACKGROUND OF THE INVENTION

The present invention relates to camera attachments for aiding in the taking of photographs and, more particularly, to camera attachments for aiding in the compression of pliant objects or subjects during the photographing thereof.

The art of photography has resulted in the creation of a multitude of camera attachments that are designed for various photographic purposes or effects. In certain photographic situations and/or for certain photographic purposes, it is desired to make or try to make an object or subject, or a portion of an object or subject, either flat or relatively flat during the photographing thereof. Out of the multitude of camera attachments of the prior art, none of them, however, are designed or suited for use in compressing or flattening an object or subject while taking a photograph of the object or subject with the camera to which the attachment is connected. Moreover, none of the prior art camera attachments allow a camera user to compress or flatten a pliant object for photographing with an adjustably fixable compression plate that maintains a measured distance between the camera and the compressed object.

Thus, heretofore, there has not been a camera attachment such that a pliant object or subject to be photographed can be flattened or compressed from its three-dimensional character into a two-dimensional object, particularly without additional external help so that a photographer's hands are free to work the camera and thus take a photograph of the object.

It is thus evident from the above that what is needed is a camera attachment that compresses or flattens a pliant object for photographing.

It is thus further evident from the above that what is needed is a camera attachment that flattens a pliant, three-dimensional object into a relatively two-dimensional object for photographing.

It is thus even further evident from the above that what is needed is a camera attachment that compresses or flattens a pliant object for photographing by the camera, the camera attachment defining a distance between a lens of the camera and the compression plate of the camera attachment that is fixedly variable within a minimum lens to plate distance and a maximum lens to plate distance.

SUMMARY OF THE INVENTION

A camera attachment is configured, adapted and/or operative to compress a pliant object or subject for allowing photographing of the object by the camera to which the camera attachment is coupled. The camera attachment allows the user to apply a variable compressive force to an object to be photographed through application of a compressive force on the camera. The variable compressive force applied by the user on the camera is translated to a compression portion of the camera attachment and onto the object. The compression portion includes a compression plate that is composed of a material suitable for the functions and/or features described herein and particularly of a material having light characteristics that range from minimally opaque to entirely translucent.

Additionally, the overall length of the camera attachment is variable through adjustable length support structures such that the distance between the camera lens and the compression plate may be changed. The lens-to-compression plate distance is thus variable, ranging from a minimum lens-to-plate distance to a maximum lens-to-plate distance. These parameters are controlled by size of the camera attachment. The adjustable length support structures of the camera attachment are independently adjustable and independently releasably fixable in length. Additionally, one or more support structure may carry representations and/or markings for providing one or more of a scale, reading, position and/or camera parameter and/or setting.

In one form, the present invention provides a camera attachment that includes a camera mounting portion adapted to be releasably secured to a camera lens, a compression portion including a compression plate for compressing against a pliant object to be photographed and to photograph the pliant object therethrough, and a plurality of length adjustable support structures attached to and extending between the camera mounting portion and the pliant object compression portion such that a compressive force applied to a camera to which the camera mounting portion is connected is translated to the pliant object compression plate.

In another form, the present invention provides a camera attachment that includes a camera mounting plate having a camera lens opening therein and configured to be releasably retained on a camera lens of a camera, the lens opening allowing a full field of view for the camera lens, a pliant object compression portion having a transparent compression plate, and an adjustable support structure connecting the pliant object compression portion with the camera mounting plate.

In yet another form, the present invention provides a method for photographing a pliant object. The method includes the steps of (a) connecting a camera attachment to a lens of a camera, the camera attachment having (i) a camera connection plate configured for connection with the camera lens (ii), a pliant object compression plate, and (iii) a plurality of length adjustable support structures attached to and extending between the camera connection plate and the pliant object compression plate, the plurality of length adjustable support structures each having securing means for releasably fixing a length thereof, (b) placing the pliant object compression plate against a pliant object, (c) providing a compressive force to the camera to transmit the compressive force to the pliant object compression plate to compress the pliant object, and (d) taking a picture of the compressed pliant object through the pliant object compression plate by the camera to which the camera attachment is connected.

The objects and advantages of the present invention will be more apparent upon reading the following detailed description in conjunction with the accompanying drawings.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Like reference numerals tend to indicate the same or similar parts throughout the several figures.

DETAILED DESCRIPTION OF THE PREFERRED EMBODIMENT

Figure 1:
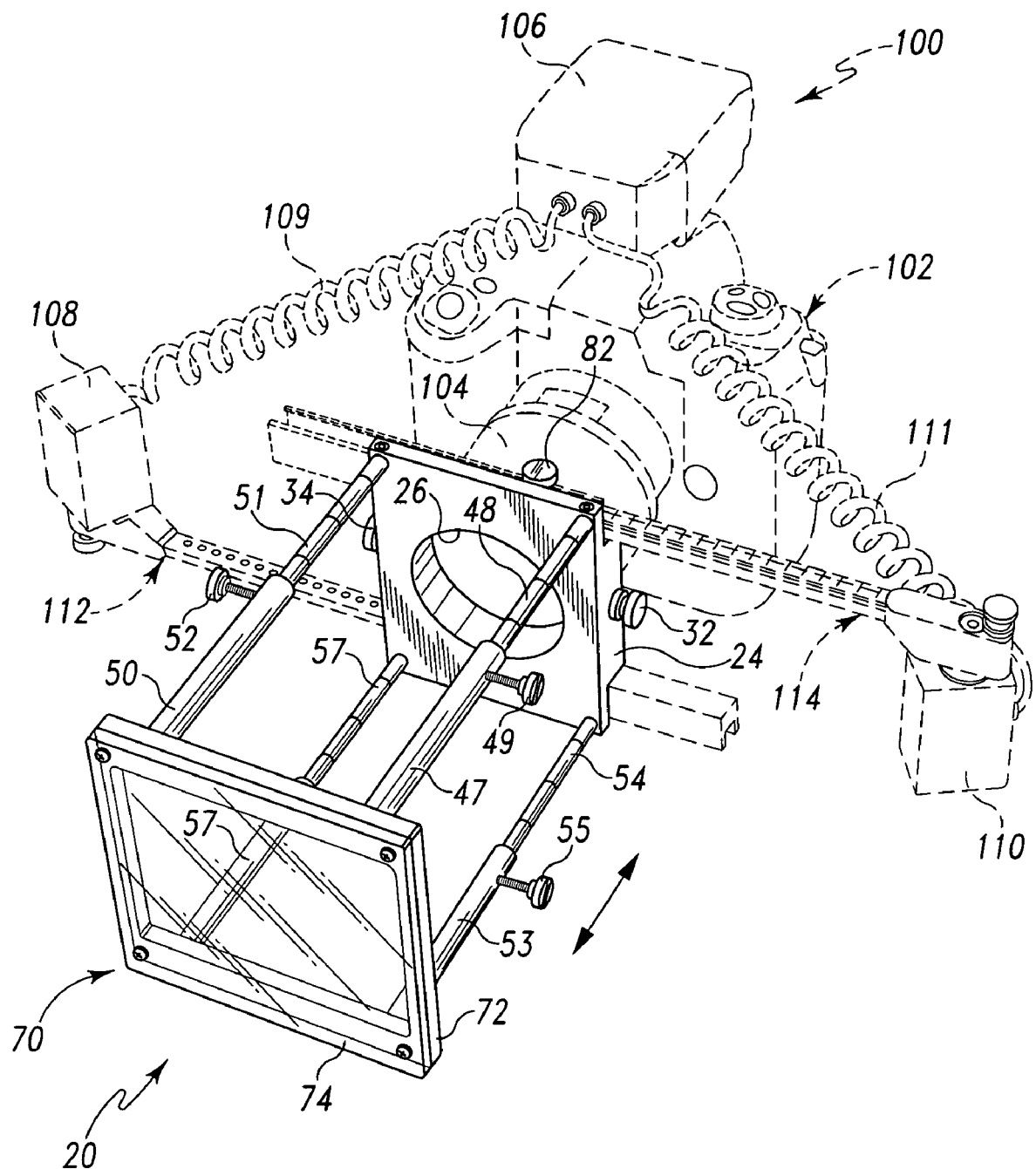
FIG. 1 is a top perspective view of an exemplary embodiment of a camera attachment in accordance with the principles of the present invention connected to an exemplary typical camera.

Referring to the figures, there is depicted an exemplary embodiment of a photography aid or camera device/apparatus, generally designated 20, fashioned in accordance with the present principles. The photography aid 20, as shown in FIG. 1, is configured to be attached to a camera, generally designated 100, in a manner that will be described below. The photography aid 20 is used to compress or flatten a pliant object into a relatively flat or compressed object without additional external help so that a photographer's hands are free to work the camera 100 and thus take a photograph of the compressed or flattened object (not shown) through the photographic aid 20. The photography aid 20 is also length adjustable such that a camera lens 104 of the camera 100 may be positioned anywhere from and between a fully extended position and a fully contracted position relative to the object to be photographed. The selected object to lens distance is also releasably fixable. Moreover, a scale may be provided on the photography aid 20 that may be calibrated for simple length indication or object/lens distance and/or camera settings.

Figure 2:
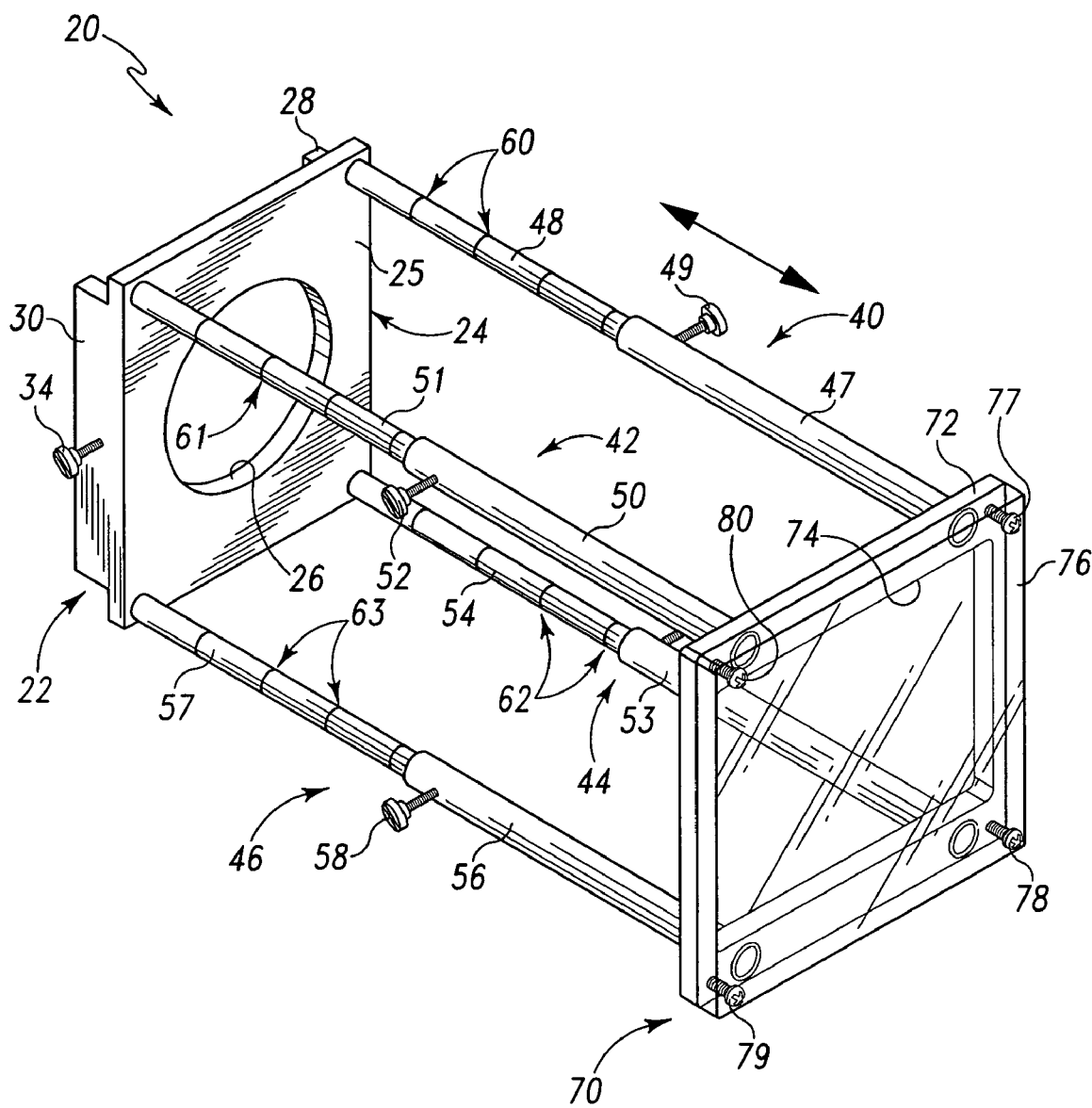
FIG. 2 is a perspective view of the exemplary camera attachment of FIG. 1.

More particularly describing the present photographic aid 20 and thus referring to FIG. 2, the photography aid 20 includes a lens or camera mounting portion 22, an object compression portion 70, and a plurality of length adjustable support structures 40, 42, 44 and 46 that are attached to and extend between the lens mounting portion 22 and the object compression portion 70. The plurality of length adjustable support structures 40, 42, 44 and 46 allow a user to move the object compression portion 70 away from or toward the lens mounting portion 22 (i.e. the camera 100 and/or lens 104), as represented by the double-headed arrow of FIG. 2. The length and thus adjustment position of each one of the support structures 40, 42, 44 and 46 is also releasably fixable. Releasable fixing of each support structure 40, 42, 44 and 46 is controlled by a thumb screw or the like 49, 52, 55 and 58 respectively. Particularly, rotation of a thumb screw in one direction causes the length position of the respective support structure to be fixed. From a fixed position, rotation in an opposite releases the support structure and allows its length to be adjustable.

The lens mounting portion 22 includes a plate 24 having an opening 26. The opening 26 is configured in the shape of the lens 104 such that the lens 104 is unobstructed. While the opening 26 is shown as round, it should be appreciated that the opening 26 may take another form to accommodate a lens having a like shape. The plate 24 is preferably fabricated from a metal, but may be fabricated from another suitable material.

The plate 24 includes a first perpendicular flange 28 that extends from one side edge of the plate 24. The flange 28 extends toward the lens 104/camera 100 when installed. The plate 24 further includes a second perpendicular flange 30 that extends from another side edge of the plate 24 opposite to the one side edge of the plate from which the first perpendicular flange 28 extends. The flange 30 extends toward the lens 104/camera 100 when installed. The first perpendicular flange 28 includes a threaded bore 29 sized to receive a first thumb screw or the like 32 (see FIG. 1). When installed, the first thumb screw 32 extends through the threaded bore 29 of the first perpendicular flange 28 and is used to secure the flange 28 to one side of the lens 104. Rotation of the first thumb screw 32 in one direction provides attachment while rotation of the thumb screw 32 in another direction provides detachment. The second perpendicular flange 30 includes a threaded bore 31 sized to receive a second thumb screw or the like 34 (see FIG. 1). When installed, the second thumb screw 34 extends through the threaded bore 31 of the second perpendicular flange 30 and is used to secure the flange 30 to another side of the lens 104. Rotation of the second thumb screw 34 in one direction provides attachment while rotation of the second thumb screw 34 in another direction provides detachment.

Figure 3:
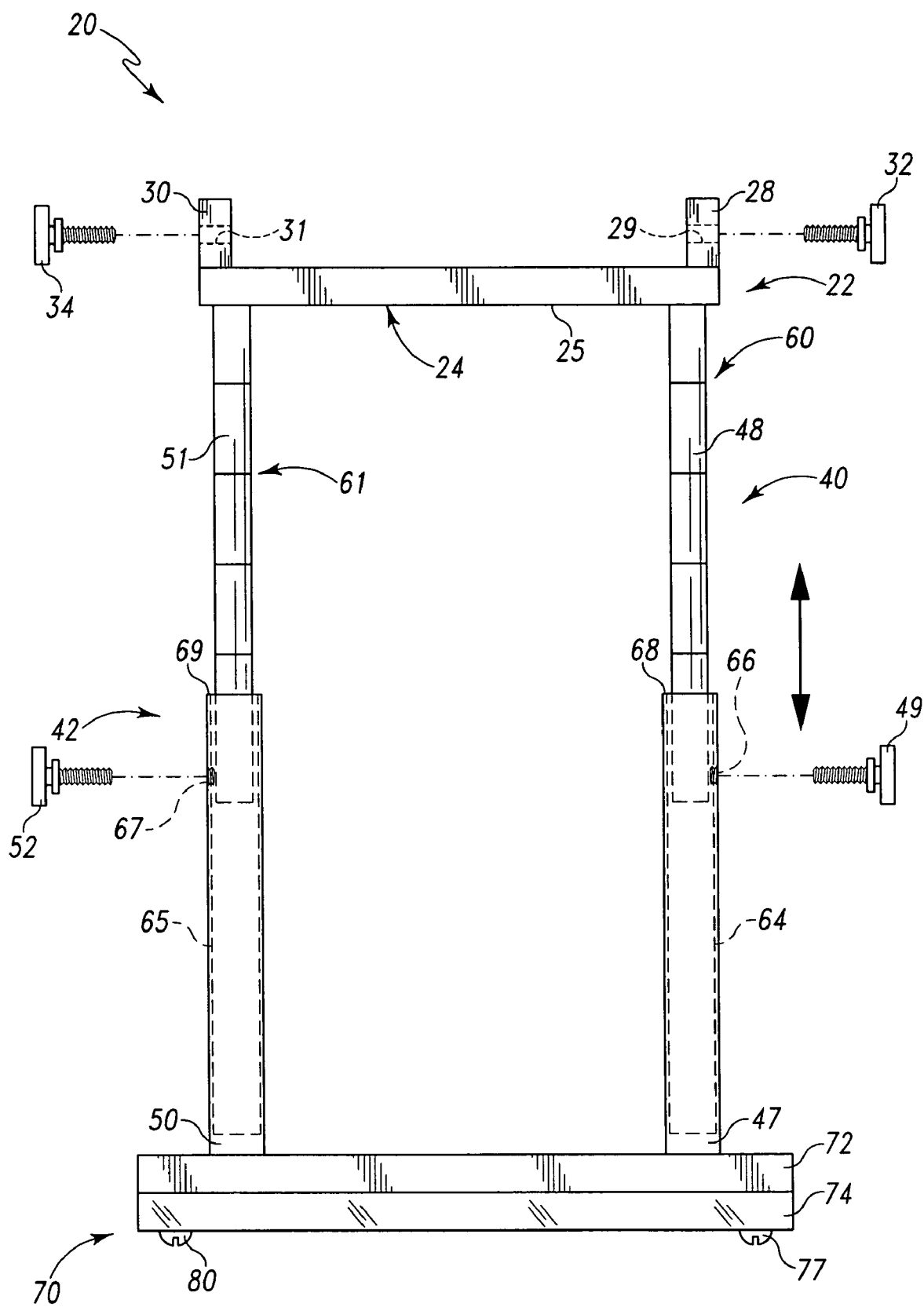
FIG. 3 is a top plan view of the exemplary camera attachment of FIG. 1.

Each support structure 40, 42, 44 and 46 of the photographic aid 20 is defined by a two part cooperating structure. Particularly support structure 40 is defined by a tube 47 and a cooperating rod 48, support structure 42 is defined by a tube 50 and cooperating rod 51, support structure 44 is defined by a tube 53 and cooperating rod 54, while support structure 46 is defined by a tube 56 and a cooperating rod 57. Each tube 47, 50, 53 and 56 defines a bore therein of which only two such bores 64 and 65 of respective tubes 47 and 50 are shown in the figures. One end of each tube 47, 50, 53 and 56 is connected to the frame 72, particularly one tube at each corner of the frame 72. Each rod 48, 51, 54 and 57 is received in the bore of its corresponding tube 47, 50, 53 and 56. One end of each rod 48, 51, 54 and 57 is connected to the plate 24, particularly one rod at each corner of the plate 24. The other end of each rod 48, 51, 54 and 57 is slidably received in the bore of its corresponding tube 47, 50, 53 and 56. Each rod is thus slidable within the corresponding or respective tube 47, 50, 53 and 56, as represented in FIG. 3 by the double-headed arrow.

It should be appreciated that while the tubes are shown connected to the compression portion and the rods are shown connected to the mounting portion, the camera attachment device is operable with the tubes having one end connected to mounting portion and the rods having one end connected to the compression portion. Additionally, a camera attachment device may have mixed orientation support structures. Moreover, the support structures may be foldable by incorporation of one or more hinges or folding mechanisms.

The position of each rod 48, 51, 54 and 57 is fixed relative to its corresponding tube 47, 50, 53 and 56 through respective thumb screws or the like 49, 52, 55 and 58. The thumb screws 49, 52, 55 and 58 are respectively disposed in threaded bores of the corresponding tubes 47, 50, 53 and 56 of which only threaded bores 66 and 67 of tubes 47 and 50 are shown. Rotation of the screws 49, 52, 55 and 58 in one direction provides affixation of the respective rod 48, 51, 54 and 57 to its corresponding tube 47, 50, 53 and 56, while rotation of the screws 49, 52, 55 and 58 in another direction provides release of the respective rod 48, 51, 54 from the corresponding tube 49, 52, 55 and 58.

Each support structure 40, 42, 44 and 46 has a plurality of marks or demarcations 60, 61, 62 and 63 on or around an outside surface thereof. The marks 60, 61, 62 and 63 define or provide one or more scales or camera adjustment positions or parameters. The scale(s) and/or reference positions or parameters are with respect to ends of the respective tubes of which only ends 68 and 69 of tubes 47 and 50 are shown. Numbers, letters and/or graphics, while not shown, may be provided along with (in addition to) or instead of the rod marks.

The compression portion 70 of the present photographic aid 20 provides two functions. One function is to provide a surface that will contact and/or compress a pliant object, objects and/or subject for photographing. The second function is to allow such photographing of the object, objects and/or subject through the surface. To this end, the photographic aid 20 includes a frame 72 that is preferably fabricated from a metal but may be fabricated from a plastic or other suitable material. The frame 72 defines an opening 74 that is here depicted as a rectangular opening. Other configurations are contemplated as well as size and/or dimensions. An end of each tube 49, 52, 55 and 58 is coupled to one side of the frame 72, particularly at the corners thereof. Mounted, secured, or retained onto another side of the frame 72 is a compression surface or plate 74. The compression plate 74 is shown secured to the frame 72 by screws 77, 78, 79 and 80 (see FIG. 2) that are preferably provided at the corners thereof.

The compression plate 74 is preferably transparent so that any compressed object is seen naturally for photographing therethrough. The compression plate 74 may, however, be slightly opaque as necessary such as for providing an effect or the like to the photograph. Moreover, the compression plate 74 may be a photographic filter or the like. Still further, the compression plate 74 may be colored or provide a particular photographic effect. Furthermore, the compression plate 74 may also be composed several compression plates of the same, similar or different types or variations, e.g. a layer of various functionality compression plates. The compression plate 74 is formed of a material that can withstand compression without failure (cracking, breaking or the like) and allow photographing an object therethrough. One suitable material is clear plexiglass. Glass of various types, polymer glass, plastic and/or the like may also be used for the compression plate 74.

The four support structures or legs 40, 42, 44 and 46 gives the compression portion 70 stability and strength relative to the camera 100. Particularly, the force or exertion provided against the compression plate 72 of the compression portion 70 by the user provides the necessary compression force for the compression plate 74 to compress against a pliant object/subject or objects/subjects in order to compress, squash, mash, flatten, or spread out the pliant object/subject or objects/subjects for photographing.

Referring back to FIG. 1, the camera 100 is shown with an optional, hence in dashed line, flash system. It should be appreciated that the camera 100 need not have a flash unit for use of or by the present camera attachment 20 or camera 100 but is shown with the camera 100 to illustrate the flexibility of use of the present invention. In this regard, the camera 100 includes a flash charging unit 106 that is carried on a top portion of the camera 100. The flash charging unit 106 has two flash cords 109 and 111 that are operatively connected to first and second flash units 108 and 110. Each flash unit 108 and 110 is carried on a respective arm 112, 114 that is, in turn, carried by the plate 24. The arms 112 and 114 extend across further opposite sides of the lens 104 and cutouts of the lens mounting portion 22 formed by the flanges 28 and 30 the plate 24. The arms 112, 114 are independently adjustable along the lens in order to adjust the distance from the flash units 108, 110 to the compression plate 74 and thus the compressed object. Thumb screws or the like (of which only one such thumb screw 82 in FIG. 1 is shown) are used to releasably fix the arms 112, 114 in position in a known manner. The flash units 108 and 110 are also independently rotatable with respect to and on an end of respective arms 112, 114.

The present camera attachment provides object compression for object photography therethrough that moves with and is fixed relative to a camera. Additionally, since the length of the present camera attachment is adjustable, a wide range of photographic area is possible.

While the invention has been illustrated and described in detail in the drawings and foregoing description, the same is to be considered as illustrative and not restrictive in character, it being understood that only preferred embodiments has been shown and described and that all changes and modifications that come within the spirit of the invention are desired to be protected.

What is claimed is:

1. A camera attachment comprising:
 a camera mounting portion adapted to be releasably secured to a camera lens;
 a compression portion including a compression plate for compressing against a pliant object to be photographed and to photograph the pliant object therethrough; and
 a plurality of length adjustable support structures attached to and extending between the camera mounting portion and the compression portion such that a compressive force applied to a camera to which the camera mounting portion is connected is translated to the compression plate.

2. The camera attachment of claim 1, wherein the compression plate is transparent.

3. The camera attachment of claim 1, wherein the compression plate is formed of a plastic glass.

4. The camera attachment of claim 1, wherein one of the length adjustable support structures includes markings representing one of a scale, a camera parameter and a camera setting.

5. The camera attachment of claim 1, wherein the camera mounting portion includes a mounting plate having a lens opening there sized to allow a full field of view for the camera lens onto which the camera mounting portion is secured.

6. The camera attachment of claim 1, wherein the compression portion includes a frame defining an opening for allowing photographing through the compression plate.

7. The camera attachment of claim 1, wherein each support structure comprises:
 a tube having one end coupled to one side of one of the camera mounting portion and the compression portion;
 a rod having one end connected to one side of the other one of the camera mounting portion and the compression portion; and
 securing means associated with the tube and operable to releasably fix the rod to the tube.

8. A camera attachment comprising:
 a camera mounting plate having a camera lens opening therein and configured to be releasably retained on a camera lens of a camera, the lens opening allowing a full field of view for the camera lens;
 a pliant object compression portion having a transparent compression plate; and
 an adjustable support structure connecting the pliant object compression portion with the camera mounting plate.

9. The camera attachment of claim 8, wherein the pliant object compression portion comprises a rectangular frame having a rectangular opening therein through which to allow for photographing through the transparent compression plate.

10. The camera attachment of claim 9, wherein the transparent compression plate comprises a rectangular piece of plexi-glass.

11. The camera attachment of claim 10, wherein the rectangular piece of plexi-glass is colored.

12. The camera attachment of claim 8, wherein the support structure includes a plurality of adjustable supporting structures.

13. A method for photographing a pliant object comprising the steps of:
- connecting a camera attachment to a lens of a camera, the camera attachment having:
  - a camera connection plate configured for connection with the camera lens,
  - a pliant object compression plate; and
  - a plurality of length adjustable support structures attached to and extending between the camera connection plate and the pliant object compression plate, the plurality of length adjustable support structures each having securing means for releasably fixing a length thereof;
- placing the pliant object compression plate against a pliant object;
- providing a compressive force to the camera to transmit the compressive force to the pliant object compression plate to compress the pliant object; and
- taking a picture of the compressed pliant object through the pliant object compression plate by the camera to which the camera attachment is connected.

14. The method of claim 13, wherein the pliant object compression plate is transparent.

15. The method of claim 14, wherein the pliant object compression plate is formed of a plexiglass.

* * * * *